Oct. 21, 1958 W. R. BAIN ET AL 2,857,182
SHAFT SEAL
Filed May 31, 1955 2 Sheets-Sheet 2
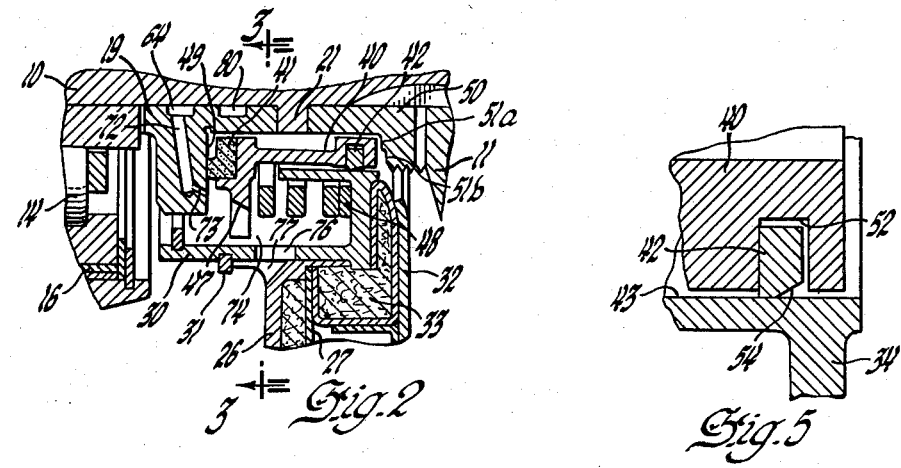
Fig. 2
Fig. 5
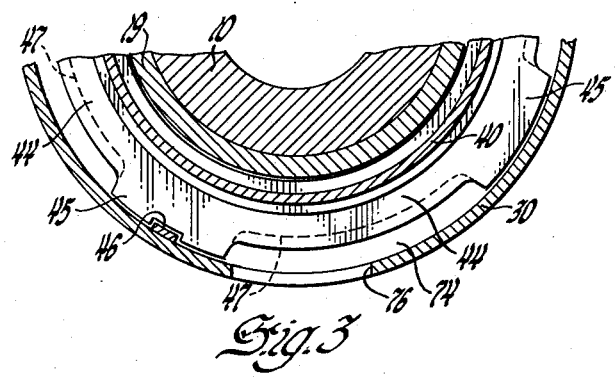
Fig. 3
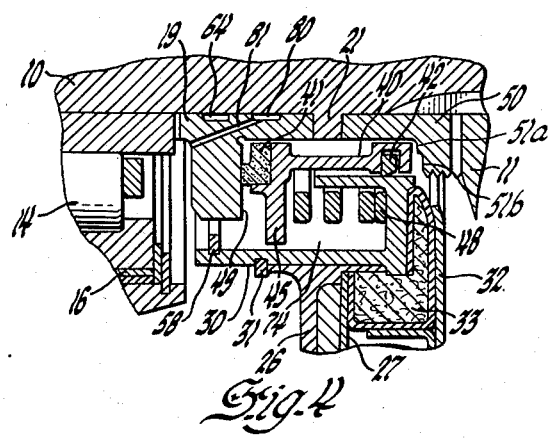
Fig. 4
INVENTORS
William R. Bain
Frederick W. Hoeltje,
Wylie L. Johnson, III &
John B. Wheatley
BY
Paul Fitzpatrick
ATTORNEY United States Patent Office 2,857,182
Patented Oct. 21, 1958

2,857,182

SHAFT SEAL

William R. Bain, Frederick W. Hoeltje, Wylie L. Johnson III, and John B. Wheatley, Indianapolis, Ind., assignors to General Motors Corporation, Detroit, Mich., a corporation of Delaware Application May 31, 1955, Serial No. 512,226

12 Claims. (Cl. 286—11.14)

Our invention relates to an improved seal to prevent fluid flow along a rotating shaft. The seal involves special and unusual features particularly adapting it to solve a very difficult sealing problem in a gas turbine engine of known type.

In this engine, there is a turbine which is supplied with very hot gases at a pressure of about 200 pounds to the square inch, and adjacent the turbine is a roller bearing which supports the forward end of the turbine shaft. The bearing must be lubricated, and it is necessary to keep the lubricating oil out of the turbine where it would coke and form deposits; and also necessary to keep the hot high pressure gases away from the bearing, which they would ruin.

Because of the rather high temperatures and pressure involved and the high speed of rotation of typical turbine shafts, the solution of this sealing problem has been quite difficult. In some similar installations, contact type seals have been relied upon to contain the oil and labyrinth seals have been relied upon to contain, as well as they may, the high pressure gas. This sort of installation necessarily involves waste of motive fluid or of sealing air under pressure through the labyrinth seals to overboard vents, with substantial loss in engine efficiency.

Another factor that increases the difficulty of sealing the particular installation is the existence of quite substantial relative axial movement between the shaft and the fixed structure in which it is supported, as a result of differential thermal expansion in the engine between its condition of rest when cold and succeeding conditions as it heats up upon being started and cools upon being shut down.

In such an installation, the seal is not only adjacent the hot turbine, it is also surrounded by the combustion apparatus of the engine, with the result that high temperatures have caused carbonization of the oil to form deposits which have interfered with the movement of seals and prevented good sealing contact. The seal according to the invention is cooled by circulation of oil.

The principal object of the invention is to provide a shaft seal which operates successfully under unfavorable conditions of pressure, temperature, shaft movement, and high speed. A secondary object is to improve the efficiency and reliability of gas turbine engines.

By way of introduction to the detailed description of the invention, it may be stated that the complete seal installation in its preferred embodiment comprises a seal follower mounted on the shaft and a seal member comprising a sleeve non-rotatably mounted in the supporting structure for the shaft carrying a carbon seal annulus engaging the face of the seal follower under the urging of a spring. The sleeve is reciprocably mounted in the support to follow the axial shifting of the shaft and there is provided a seal of the piston ring type between the sleeve and the support. The piston ring is chamfered on its rubbing surface so that the pressure against which the seal operates is exerted against the major part of the sealing peripheral surface of the piston ring seal to balance in large measure the pressure against the peripheral surface which is contained in the seal groove. The sealing face of the carbon annulus is spaced from the shaft so that gas pressure is exerted against the front end of the sleeve to nearly balance the pressure exerted against the rear end of the sleeve.

The follower is supplied with lubricating oil under pressure from within the shaft and has jets drilled in it from which this oil is discharged against the adjacent bearing, onto the interface between the carbon annulus and the follower, and into a cage within which the reciprocating sleeve and spring are mounted. The oil supplied to the cage acts to cool these parts and normally prevents any deposits from forming thereon.

As it is possible for the seal to stick, particularly upon formations of carbon in the cage bore, the follower may separate from the carbon annulus when the engine is started. A feature of the invention lies in the provision of a shoulder or bumper on the shaft which is normally spaced from the sleeve but which engages it and dislodges it when the seal moves away from the seal follower.

The nature of the invention and the advantages thereof will be clearly apparent from the subsequent detailed description of an illustrative installation of the preferred embodiment of the invention and the accompanying drawings thereof, in which:

Figure 2 is a fragmentary sectional view taken on a vertical plane containing the shaft axis;

Figure 3 is a partial transverse sectional view of the seal assembly taken on the plane indicated by the line 3—3 in Figure 2;

Figure 4 is an enlarged sectional view of the seal follower; and

Figure 5 is an enlarged fragmentary sectional view showing the piston ring seal.

Figure 1:
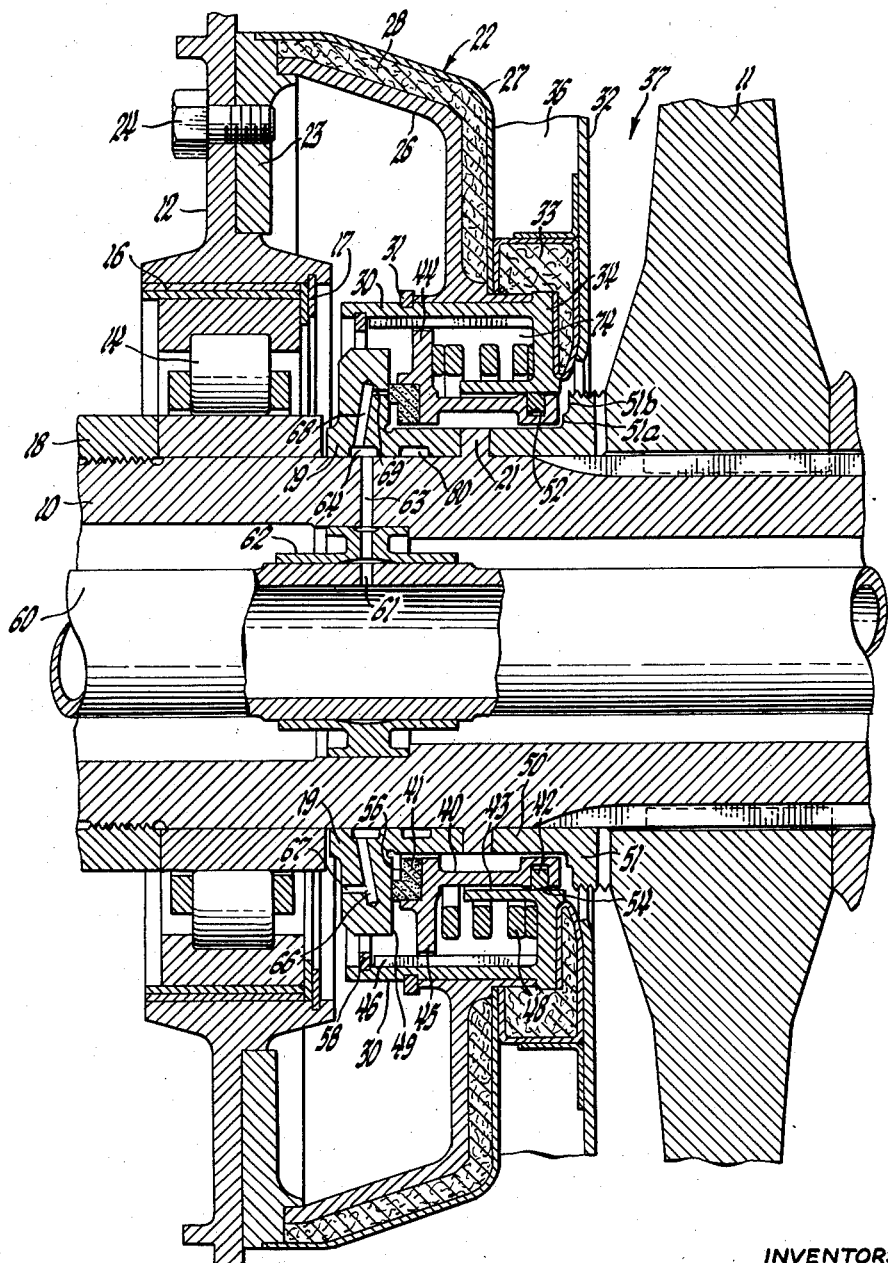
Figure 1 is a fragmentary sectional view of a gas turbine taken on a plane containing the axis of the turbine shaft.

It may be pointed out that no effort has been made to illustrate an entire gas turbine engine since it is not needed for understanding the invention and also because the invention, while particularly suited for gas turbines, is capable of employment in other types of rotating machinery.

The turbine illustrated framentarily in Figure 1 is of known type including a shaft 10 on which are mounted turbine wheels 11, the first wheel being shown. The turbine shaft and wheels are mounted in a casing or stator which includes a front bearing support structure 12. This support structure is flanged to receive the outer race of a roller bearing 14. A vibration damping ring 16 may be fitted between the outer race of the bearing and the support. The bearing is held between an abutment on the support and an expanding lock ring 17. The inner race of the bearing 14 is held in place by a threaded collar 18 which urges the inner race against a seal follower ring 19 which in turn engages a ridge 21 on the shaft. Bearing 14 is shielded from the turbine by a sump assembly weldment 22 including an inwardly directed flange 23 fixed to the bearing support by cap screws 24. The sump assembly comprises an inner plate 26, an outer plate 27, and heat insulating material 28 between the plates. A cage or support 30 is fitted in the cylindrical central opening of the plate 26 and retained by a contracting snap ring 31.

A radial plate or heat shield 32 is mounted in front of the first turbine wheel and separated from the sump assembly 22 by a heat insulating ring 33 which abuts the rear wall 34 of the cage 30. The space 36 between the bearing sump and plate 32 and the space 37 between that plate and the turbine wheel 11 contains compressed air under a pressure of the order of 200 pounds per square inch, which slightly exceeds that of the motive fluid in the turbine; thus, the compressed air escapes from spaces 36 and 37 into the turbine. Limited quantities of compressed air are admitted to these spaces to create a slight flow into the turbine so that the combustion products in the turbine will not flow inwardly from the motive fluid annulus. This compressed air is derived from the combustion chamber jacket of the engine and is quite hot as a result of compression and, to some extent, to heating in the combustion apparatus. Hot as it is, it cools to some extent the still hotter turbine wheel 11. The bearing 14, of course, must be lubricated and, therefore, the seal serves the purpose of keeping the hot gas out of the bearing and bearing sump and keeping the lubricating oil from escaping into the turbine where it would be coked by the hot turbine wheel.

Considering now more specifically the seal structure, as distinguished from its environment, the seal comprises the follower 19 and the cage 30 previously mentioned. It also comprises a sleeve 40 which carries the carbon seal annulus or ring 41. This particular ring is referred to as an "annulus" to distinguish it from the piston ring type sealing ring 42 mounted in a groove in the outer surface of the rear end of sleeve 40. The piston ring seal bears against the inner cylindrical surface 43 of the cage 30. The sleeve 40 comprises a flange 44, the periphery of which bears four projections 45 with sliding clearance in the cylindrical interior of the cage 30. Notches in two of these projections receive ribs 46 brazed to the interior of the cage so that the sleeve 40 is non-rotatably mounted. The edge of the flange 44 is chamfered at 47 between the projections. The carbon annulus 41 is fitted in a recess in the face of the sleeve 40. A coil spring 48 held between the rear wall 34 of the cage and the flange 44 urges the sleeve forward and thereby biases the carbon annulus into engagement with the nitrided rear radial face 49 of an outwardly extending flange of the follower 19. The sleeve and carbon annulus are dimensioned for slight clearance, such as about 1/50 of an inch, from the rotating parts within them, which are the hub of the follower 19 and a spacer ring 50 impinged between the rib 21 on the shaft and the forward turbine wheel 11. The spacer 50 includes a flange 51 with a threaded external surface, which flange normally is slightly spaced from the rear end or face of sleeve 40. It will be seen, therefore, that the seal assembly as a whole comprises a rotary contact seal between the face 49 of the follower and the face of the carbon annulus 41 and comprises a sliding contact seal between the sleeve 40 and cage 30 provided by piston ring 42.

The piston ring seal 42 is of the expanding type and, because of the relatively high pressure existing to the rear of the seal; that is, in the space 37, the ring 42 is urged against the forward face of the groove 52 in which it is mounted and the high pressure gas enters the space within the groove under the inner periphery of the ring. This pressure urges the ring radially outward and tends to provide too great rubbing force between the piston ring and the surface 43. For this reason, therefore, the outer periphery of the seal is chamfered as indicated at 54 (Figure 5) so that about two-thirds to three-fourths of the outer face of the ring is relieved to permit the high pressure gas to exert an inward force over the major part of the exterior of the ring. In this way the rubbing force between the ring 42 and the bore 43 is maintained at a reasonable level to prevent undue friction at this point of sliding contact.

As will be apparent, the high gas pressure is exerted against the rear face of sleeve 40 between the spacer ring 50 and the bore 43 of the cage. This force would cause too heavy rubbing contact between the carbon annulus and the follower unless balanced. To prevent this, the forward face of the carbon annulus is recessed as indicated at 56 so that the gas pressure is exerted over the area of this recess which is but slightly smaller than the piston area at the rear face of the sleeve. The air pressure may be assumed to be exerted on an annular piston extending from the inner radius of the sleeve 40 approximately to the mean radius of the rubbing part of the carbon annulus. The pressure acting on this piston urges the sleeve rearwardly. The air pressure is also exerted against an annular piston consisting of the entire rear face of the sleeve 40 and the piston ring 42 to urge the sleeve forwardly. The effective area exposed to the air pressure in the rear is slightly greater than that at the front so that the gas pressure adds slightly to the force of spring 48 in maintaining the seal annulus in contact with the follower. It would not do to have too high a gas load on the seal, as the endurance of the seal would be reduced by excessive loading.

In addition to the action described above, the bumper flange 51 may assist in urging the sleeve 40 forwardly with respect to the cage 30. As may be noted, the forward face of the flange 51 is stepped to provide an inner abutment 51a and a recessed or undercut outer portion 51b. The abutment 51a will approach the inner part of the rear face of sleeve 30 in the event that the shaft moves forwardly with respect to sleeve 40 because of sticking of the sleeve in bore 43. If this happens, there is no longer contact of the carbon annulus with the follower, and there is no longer full pressure against the forward piston area, since air can flow out into the sump 26 which is vented. As the abutment 51a approaches the sleeve, the gas pressure is throttled at this point and, since the full pressure in space 37 can be exerted between the recess 51b and the major part of the rear piston face of sleeve 40, there is an unbalance of pressure on the sleeve tending to urge it forward. This pressure unbalance increases as the gap between abutment 51a and sleeve 40 closes. Thus, if the sleeve 40 tends to stick as the shaft 10 moves forward relative to the cage 30, an unbalanced gas force pressing forwardly on the seal gradually increases, acting to break it loose and force it into contact with the seal follower. It is believed that in most cases the unbalanced gas pressure will suffice for this purpose. If it does not, actual contact may occur between the abutment 51a and sleeve 40 to jar it loose, upon which the unbalanced pressure will act to propel the sleeve 40 forward.

An expanding snap ring 58 serves to retain the sleeve in the cage in the disassembled condition of the machine. When the turbine wheel is in place and the turbine shaft is in position, the sleeve 44 does not engage the ring 58.

A feature of the seal lies in the provision for lubricating and cooling the seal assembly and in the combination of this with the turbine bearing lubrication. Lubricating oil for the turbine bearing is supplied through hollow turbine tie bolt 60 by means which are immaterial to the present invention but which may be as described in U. S. Patent 2,693,248 to Gaubatz and Wheatley. The oil under pressure in the tie bolt 60 flows radially outwardly through passage 61, a passage in a spacer 62, and a radial passage 63 in the shaft into an annular groove 64 in the inner surface of the follower ring 19.

This groove provides a distributing chamber by which the oil is conducted to a number of ports or jets which direct it into the bearing 14 for lubrication thereof, against the face of the carbon annulus, and into the cage 30 to cool the seal and lubricate the movable parts thereof. Referring to Figure 1, a drilled radial passage 66 and an axially extending jet or port 67 discharge oil into bearing 14. A radial passage 68 and a small rearwardly directed passage 69 lubricate the face of the seal annulus. Passage 69 is substantially at the mean radius of the contacting face portions of the carbon annulus and follower.

Referring to Figure 2, intersecting drilled passages 72 and 73 provide a port for discharge of oil at an angle of approximately 30° to the shaft axis from the rotating follower into the cage 30. This jet or spray flows past the chamfered portions 47 of the flange 44 and into the chamber 74 within which spring 48 is mounted. There is a substantial discharge of oil into this annular space, which oil floods and cools parts 30, 40, and 48 and drains into the sump assembly 22 through a slot 76 in the bottom of cage 30 and a notch 77 in the front edge of the inner flange of plate 26. Since there is considerable heat conducted into the area of the seal by the turbine wheel and turbine shaft a substantial quantity of oil is discharged into the seal cage to keep the parts below a temperature which deposition of solid matter from the oil occurs. This cooling oil is kept out of the turbine by seals 41 and 42.

In order to prevent any seepage of oil from chamber 64 between the follower 19 and flange 21 of the shaft, which oil could then escape into the turbine, a second groove 80 is provided in the interior of the follower to the rear of groove 64. Groove 80 drains through four circumferentially spaced drilled vents 81 (Figure 4). Any compressed air leaking along the inside of follower 19 from within the sleeve 40 would escape through vents 81.

Considering now the operation of the seal in general, it should be pointed out that the relative position of the parts shown in Figure 1 is that obtaining when the engine is cold. The shaft 10 is coupled to the stationary structure of the engine through a thrust bearing forward of roller bearing 14. When the engine is started, the stationary structure immediately becomes quite hot and expands so that the bearing support 12 moves rearwardly relatively to the shaft. In other words, the cage 30 moves rearwardly with respect to follower 19. The spring 48 and the slight unbalance of air pressure on sleeve 40 should move the sleeve forwardly relative to the cage to maintain the rotary seal in engagement; however, there is some possibility of undue friction after the engine has been standing, so that it is possible for the seal to be carried rearwardly away from the follower. If this happens, however, upon slight movement thereof, the rear end of sleeve 40 approaches the abutment 51a, creating an unbalance of air pressure between the rear and forward piston faces of sleeve 40 as previously described, to move the sleeve forward and close the gap between carbon annulus 41 and the follower face 49. If the unbalance of pressure does not suffice, upon slight further movement of the shaft, sleeve 40 engages the bumper flange 51 so that it can no longer move rearwardly with the cage and is forced loose, whereupon the spring and air pressure can be depended upon to complete the sealing engagement. The total initial movement upon starting at the bearing 14 in a particular case may be about ⅕ of an inch. After the engine is run for a few moments, the shaft, which heats more slowly than the stationary combustion structure, expands to some extent and thus there is a slight reversal of the relative expansion. In other words, the shaft moves backwardly relatively to the shaft structure. The total expansion of the shaft, however, is less than that of the case. This last movement is accommodated by compression of spring 48. The outer surface of bumper flange 51 is threaded so that the threads move forwardly when the turbine operates. Under engine operation conditions, relative expansion of the stator and rotor draws the shaft forward so that flange 51 enters the rear end of bore 43 of the cage, in which it rotates with slight clearance. In case of failure of the seal, parts 51 and 43 will serve as a labyrinth seal of rather limited efficiency. Upon shutting the engine down, the stationary and rotating parts cool and the casing shifts forwardly relative to the shaft to the position illustrated in Figure 1.

The oil film maintained between the rubbing surfaces of the rotating seal by the jet 69 minimizes frictional heating and wear, providing long life for the seal. The cooling jet injected into the cage keeps the seal at a livable temperature. The presence of a satisfactory sliding contact seal is also essential to proper operation of the seal assembly. In view of the ambient temperatures, rubberlike materials which would otherwise be very desirable for this purpose are not usable and, therefore, resort is had to the piston ring type seal, and in this connection the chamfering of the sealing peripheral surface of the ring 42 has been found most beneficial in reducing friction in the sliding seal.

It will be seen from the foregoing that the combination of a number of features distinguish this seal from ordinary rotating contact seals. These features have produced a highly successful solution to a very difficult sealing problem. The particular utility of the seal of the invention for the gas turbine as described will, of course, be apparent, but it will also be clear to those skilled in the art that this seal is suitable for many fluid sealing applications.

The detailed description of the preferred embodiment of the invention for the purpose of explaining the principles thereof is not to be construed as limiting the scope of the invention, as many modifications may be made by the use of skill in the art within the bounds of the invention.

We claim:

1. A fluid seal organization of the sliding contact type comprising, in combination, a support member, the support member including a cage portion, a shaft rotatably mounted by the support with freedom for relative axial movement, a seal follower mounted on the shaft adjacent the bearing, a sleeve encircling the shaft adjacent the follower, the sleeve being reciprocably mounted in the cage portion, means to restrain said sleeve against rotation relative to said cage, a face contact seal annulus mounted on the sleeve and having a face engaging the seal follower, means yieldably urging the seal annulus into engagement with the follower, a peripheral contact reciprocating seal ring sealing between the support member and the sleeve member, the seal ring being mounted in a groove in one of said members and having one of its peripheral surfaces engaging a cylindrical surface of the other of said members, the said peripheral surface being relieved over a substantial portion of its axial extent, said relieved portion and the other of said peripheral surfaces exposed to fluid pressure, means defining an abutment on the shaft spaced from the sleeve when the seal annulus is in contact with the follower adapted to move the sleeve toward the follower upon axial movement of the shaft when the seal annulus is spaced from the follower, the shaft including means for conducting lubricating oil under pressure into the follower, the follower defining oil delivery ports communicating with the said conducting means, the said ports including a port discharging against the face of the seal annulus, a port discharging against the shaft where it is mounted in the support, and a port discharging into the cage portion, the cage portion having an oil drain therefrom.

2. A fluid seal organization of the sliding contact type comprising, in combination, a support member, a shaft rotatably mounted in the support member with freedom for relative axial movement, a seal follower fixed on the shaft, a face contact seal member encircling the shaft adjacent the follower having a face engaging the seal follower, the seal member being reciprocably mounted on the support member and restrained against rotation, means urging the seal member into engagement with the follower, a reciprocating seal means sealing between the support member and the seal member, means defining an abutment fixed on the shaft axially spaced from the seal member when the seal member is in contact with the follower adapted to move the seal member toward the follower upon axial movement of the follower away from the seal member, the shaft including means for conducting lubricating oil under pressure into the follower, the follower defining oil delivery ports communicating with the said conducting means, the said ports including a port discharging against the face of the seal member and a port discharging into the support member radially outwardly of the seal member.

3. A fluid seal organization of the sliding contact type comprising, in combination, a support member, a shaft rotatably mounted in the support member with freedom for relative axial movement, a seal follower on the shaft, a face contact seal member having a face engaging the seal follower, the seal member being reciprocably mounted in the support member and restrained against relative rotation thereto, means urging the seal member into engagement with the follower, reciprocating seal means sealing between the support member and the seal member, and means defining an abutment on the shaft and movable therewith adapted to move the seal member toward the follower upon axial movement of the shaft and the follower away from the seal member.

4. A fluid seal organization of the sliding contact type comprising, in combination, a support member, a shaft rotatably mounted in the support member with freedom for relative axial movement, a seal follower on the shaft, a face contact seal member having a face engaging the seal follower, the seal member being reciprocably mounted on the support member and restrained against rotation, means urging the seal member into engagement with the follower, reciprocating seal means sealing between the support member and the seal member, and means defining an abutment mounted on the shaft for axial movement therewith, said abutment spaced from the seal member when the seal member is in contact with the follower, said abutment adapted to contact and move the seal member toward the follower upon axial movement of the shaft and abutment when the seal member is spaced from the follower an axial distance equal to the spacing between the abutment and said seal member when the seal member is in contact with the follower.

5. A fluid seal organization of the sliding contact type comprising, in combination, a support member, the support member including a cage portion, a shaft rotatably mounted in the support member, a seal follower on the shaft, a face contact seal member having a face engaging the seal follower, the seal member being reciprocably mounted in the cage portion and restrained against rotation, means urging the seal member into engagement with the follower, and means for conducting a cooling fluid under pressure into the follower, the follower defining a fluid delivery port communicating with the said conducting means and discharging into the cage portion on one side of the seal member, means for supplying gas under pressure to the cage on the other side of the seal member, whereby the cooling fluid discharged into the cage will be prevented from passing the seal, and the cage portion having a fluid drain therefrom.

6. A fluid seal organization of the sliding contact type comprising, in combination, a support member, the support member including a cage portion, a shaft rotatably mounted in the support member with freedom for relative axial movement, a seal follower on the shaft, a face contact seal member having a face engaging the seal follower, the seal member being reciprocably mounted in the cage portion and restrained against rotation, means urging the seal member into engagement with the follower, reciprocating seal means sealing between the support member and the seal member, the shaft including means for conducting a cooling fluid under pressure into the follower, the follower defining a fluid delivery port communicating with the said conducting means and discharging into the cage portion on one side of the seal, means for conducting gas under pressure to the other side of the seal whereby cooling fluid discharged into the cage portion will be prevented from passing the seal, and the cage portion having a fluid drain therefrom.

7. A fluid seal organization of the sliding contact type comprising, in combination, a support member, the support member including a cage portion, a shaft rotatably mounted in the support member with freedom for relative axial movement, a seal follower on the shaft, a face contact seal member having a face engaging the seal follower, the seal member being reciprocably mounted in the cage portion and restrained against rotation, means urging the seal member into engagement with the follower, reciprocating seal means sealing between the support member and the seal member, the shaft including means for conducting lubricating oil under pressure into the follower, the follower defining a first oil delivery port communicating with the said conducting means and discharging directly into the cage portion, a second oil delivery port communicating with the conducting means and discharging on the seal member face and the cage portion having an oil drain therefrom.

8. A fluid seal organization of the sliding contact type comprising, in combination, a support member, a shaft rotatably mounted in the support member with freedom for relative axial movement, a seal follower on the shaft, a face contact seal member having a face engaging the seal follower, the seal member being reciprocably mounted on the support member and restrained against rotation, means urging the seal member into engagement with the follower, and a peripheral contact reciprocating seal ring sealing between the support member and the seal member, the seal ring being mounted in a groove in one of said members and having radially inner and outer peripheral surfaces, one of said surfaces engaging a cylindrical surface of the other of said members, said ring having a radial face, the radial face and the other of said peripheral surfaces being exposed to fluid under pressure, the said one peripheral surface being chamfered over a substantial portion of its axial extent from the exposed radial face thereof to minimize radial forces due to fluid pressure on the peripheral surfaces of the ring.

9. A fluid seal organization of the sliding contact type comprising, in combination, a support member, a shaft rotatably mounted in the support member with freedom for relative axial movement, a seal follower on the shaft, a face contact seal member having a face engaging the seal follower, the seal member being reciprocably mounted on the support member and restrained against rotation, means urging the seal member into engagement with the follower, and a peripheral contact seal between the support member and the seal member, said peripheral seal including a groove in one of said members, a seal ring in said groove having radially inner and outer surfaces, one of said surfaces engaging the other of said members, passage means to conduct fluid under pressure to the other of said surfaces to provide a first radial force biasing the ring into engagement with the other of said members, said other surface having a substantial portion thereof exposed to said passage means to provide a second radial lesser force in opposition to the first and thereby minimize the resultant radial force acting to engage the ring with said other member.

10. A fluid seal organization of the sliding contact type adapted to act as a seal between a rotating shaft and a support for the shaft comprising, in combination, a support, a shaft rotatably mounted in the support, a first seal member fixed on the shaft, a second seal member mounted in the support for axial movement thereto, said second seal member normally having a rotary rubbing face contact with the first seal member, said second seal member having oppositely facing surfaces adapted to be acted on by gas pressure, first conduit means for conducting fluid under pressure to act on one surface to bias the seal members in contact, second conduit means for conducting fluid pressure to act on the other surface to balance the bias force of fluid acting on the first surface, means for restricting the second conduit means to cause a decrease of pressure on the second surface whereby the force biasing the seal members into contact is increased.

11. A fluid seal adapted to act as a seal between a rotating shaft and a support for the shaft, said shaft being rotatably mounted in said support and axially movable therein, a first seal member carried by said shaft, a second seal member mounted on the support for axial movement therewith, said second seal member normally having a rotary rubbing face contact with the first seal member, said second seal member having a surface adapted to receive fluid pressure thereon to bias the seal members into sealing contact, a second surface on the second seal member adapted to receive fluid pressure thereon to balance the biasing force of fluid pressure on the first surface, passage means for conducting fluid pressure to said second surface, a variable restriction in the last mentioned passage means, said restriction being controlled by axial movement of said shaft relative to said support.

12. A fluid seal adapted to act as a seal between a rotating shaft and a support for the shaft, said shaft being rotatably mounted in said support and axially movable therein, a first seal member carried by said shaft, a second seal member mounted on the support for axial movement therewith, said second seal member normally having a rotary rubbing face contact with the first seal member, said second seal member having a surface adapted to receive fluid pressure thereon to bias the seal members into sealing contact, a second surface on the second seal member adapted to receive fluid pressure thereon to balance the biasing force of fluid pressure on the first surface, passage means for conducting fluid pressure to said second surface, an abutment carried by said shaft in close axial proximity to said second seal member, said abutment and said second seal member acting to establish a fluid passage between them, said passage being closed upon axial movement of the shaft and abutment relative to said second seal member whereby as the first seal member moves away from the second seal member the passage will be reduced and the fluid pressure on said second surface will be reduced allowing pressure acting on the first surface to move the second seal member into contact with the first seal member.

References Cited in the file of this patent
UNITED STATES PATENTS

| | | |
|---|---|---|
| 1,273,648 | De Bijll Nachenius | July 23, 1918 |
| 2,009,154 | Waseige | July 23, 1935 |
| 2,096,899 | Hornschuch | Oct. 26, 1937 |
| 2,127,151 | Aldinger | Aug. 16, 1938 |
| 2,326,824 | Browne et al. | Aug. 17, 1943 |
| 2,508,097 | Brown | May 16, 1950 |